US010688589B2

(12) United States Patent
Svendsen et al.

(10) Patent No.: US 10,688,589 B2
(45) Date of Patent: Jun. 23, 2020

(54) SYSTEM AND METHOD FOR MONITORING RESISTANCE IN A WIRE FEED DEVICE (71) Applicant: ESAB AB, Gothenburg (SE)

(72) Inventors: Benny Svendsen, Gothenburg (SE); Oscar Eriksson, Vallda (SE)

(73) Assignee: ESAB AB, Gothenburg (SE)

(*) Notice: Subject to any disclaimer, the term of this patent is extended or adjusted under 35 U.S.C. 154(b) by 356 days.

(21) Appl. No.: 15/628,262

(22) Filed: Jun. 20, 2017

(65) Prior Publication Data
US 2018/0361494 A1 Dec. 20, 2018

(51) Int. Cl.
B23K 9/12 (2006.01)
B23K 9/095 (2006.01)
B23K 9/133 (2006.01)
B23K 31/12 (2006.01)

(52) U.S. Cl.
CPC .............. B23K 9/124 (2013.01); B23K 9/095 (2013.01); B23K 9/0953 (2013.01); B23K 9/133 (2013.01); B23K 31/125 (2013.01)

(58) Field of Classification Search
CPC .... B23K 31/125; B23K 9/095; B23K 9/0953; B23K 9/124; B23K 9/133; B23K 9/0956; B23K 9/125; B23K 9/327
USPC ..... 219/137.63, 137.7, 137.71, 137.9, 130.1, 219/133, 137
See application file for complete search history.

(56) References Cited

U.S. PATENT DOCUMENTS

| 4,482,798 A | * | 11/1984 | Hurlebaus | B23K 9/0734 219/137.71 |
| 4,584,458 A | * | 4/1986 | Tremblay | B23K 9/0731 219/136 |
| 5,427,327 A | * | 6/1995 | Anderson | B21C 47/32 242/362 |
| 5,517,676 A | * | 5/1996 | Sekine | H01Q 1/242 343/702 |
| 7,032,814 B2 | | 4/2006 | Blankenship | |

(Continued)

FOREIGN PATENT DOCUMENTS

WO 2008/031052 A2 3/2008
WO 2008/150271 A1 12/2008
WO 2012/162709 A1 12/2012

OTHER PUBLICATIONS

Notification of Transmittal of International Search Report and Written Opinion including International Search Report and Written Opinion for PCT/IB2018/054394 dated Oct. 5, 2018, 13 pages.

Primary Examiner — Tu B Hoang
Assistant Examiner — Tiffany T Tran
(74) Attorney, Agent, or Firm — Edell, Shapiro & Finnan, LLC (57) ABSTRACT A system for monitoring a welding device including a wire feed device and a processor communicatively coupled to a non-transitory computer-readable medium. The wire feed device may include a motor to rotate a roller to advance a filler wire from a bobbin towards a torch. The processor may execute instructions stored on the non-transitory computer-readable medium to determine an applied feed force parameter and a threshold feed force parameter and compare the applied feed force parameter to the threshold feed force parameter to update an error state indicator, such as a user interface, for example.

16 Claims, 5 Drawing Sheets (56) References Cited

U.S. PATENT DOCUMENTS

| | | | |
|---|---|---|---|
| 2007/0158324 A1* | 7/2007 | O'Donnell | B23K 9/1068 |
| | | | 219/137.71 |
| 2008/0257874 A1* | 10/2008 | Kaufman | B23K 9/124 |
| | | | 219/137 R |
| 2008/0296278 A1* | 12/2008 | Meckler | B23K 9/124 |
| | | | 219/137.71 |
| 2009/0173726 A1* | 7/2009 | Davidson | B23K 9/0956 |
| | | | 219/130.01 |
| 2011/0198329 A1 | 8/2011 | Davidson et al. | |
| 2013/0119036 A1 | 5/2013 | Daniel | |
| 2013/0253728 A1* | 9/2013 | Stumpfl | B23K 9/125 |
| | | | 700/301 |
| 2015/0273612 A1* | 10/2015 | Peters | B23K 35/0261 |
| | | | 219/121.65 |
| 2017/0165779 A1* | 6/2017 | Barhorst | B23K 9/1093 |

* cited by examiner

FIG. 5 even subscripts so I must be careful...

SYSTEM AND METHOD FOR MONITORING RESISTANCE IN A WIRE FEED DEVICE

FIELD OF THE DISCLOSURE

Embodiments of the present disclosure relate generally to filler wire feed monitoring systems and methods, and more particularly to a system and method for continuously monitoring filler wire feed parameters.

BACKGROUND OF THE DISCLOSURE

During welding operations, it is often advantageous or necessary to monitor the speed with which a filler wire is fed through a welding torch to an area that is being welded. This speed is commonly referred to as a "wire feed speed." If a wire feed speed is known, it can be used to determine whether a wire feed device is operating properly and/or whether problems exist that may be detrimental to a welding operation. Further, if wire feed speeds are continuously measured during a welding operation, real-time adjustments can be made to a wire feed device and/or to a welding torch in order to optimize the welding operation.

Undesirable variations in wire feed speed may result from a worn or contaminated wire liner in a welding torch, a worn or contaminated contact tip of a welding torch, and/or slippage of wire drive rolls in a wire feed device. For example, an amount of contamination (e.g., particulate) may accumulate on a wire liner of a welding torch over time, thereby increasing friction between the wire liner and a filler wire that is fed through the welding torch. Such increases in friction may cause pronounced fluctuations in wire feed speed and, in some cases, may result in wire buckling. These problems may be exacerbated if the filler wire is made of difficult-to-feed alloys such as aluminum.

As manufacturing standards continue to increase, so does the demand for welding systems that are able to reliably provide uniform, high quality welds. Thus, it would be advantageous to provide a system and a method for accurately monitoring wire feed parameters, including wire feed speed, so that undesirable variations in such parameters can be detected and corrected to achieve uniform, high-quality welds throughout a welding operation.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of a system for monitoring a welding device in accordance with the present disclosure can include a wire feed device and a processor communicatively coupled to a non-transitory computer-readable medium. The wire feed device may include a motor to rotate a roller to advance a filler wire from a bobbin towards a torch. The processor may execute instructions stored on the non-transitory computer-readable medium to determine an applied feed force parameter and a threshold feed force parameter and compare the applied feed force parameter to the threshold feed force parameter to update an error state indicator, such as a user interface, for example. In various embodiments, the processor may execute instructions stored on the non-transitory computer-readable medium to identify a filler wire characteristic of the filler wire and a torch characteristic of the torch and determine the threshold feed force parameter based on the filler wire characteristic and the torch characteristic. In some embodiments, the processor may execute instructions stored on the non-transitory computer-readable medium to calculate the applied feed force parameter based on a current drawn by the motor or a torque sensor measurement.

An exemplary method for monitoring a welding device in accordance with the present disclosure may include: identifying a filler wire characteristic of a filler wire and a torch characteristic of a torch; determining a threshold feed force parameter based on the filler wire characteristic and the torch characteristic; calculating an applied feed force parameter based on a current drawn by a motor or a torque sensor measurement, the motor to rotate a roller to advance the filler wire from a bobbin towards the torch; and comparing the applied feed force parameter to the threshold feed force parameter to update an error state indicator.

BRIEF DESCRIPTION OF THE DRAWINGS

By way of example, various embodiments of the disclosed device will now be described, with reference to the accompanying drawings, in which.

DETAILED DESCRIPTION

Embodiments of the present disclosure will now be described more fully hereinafter with reference to the accompanying drawings, in which certain exemplary embodiments are shown. The subject matter of the present disclosure, however, may be embodied in many different forms and should not be construed as limited to the embodiments set forth herein. Rather, these embodiments are provided so that this disclosure will be thorough and complete, and will fully convey the scope of the subject matter to those skilled in the art. In the drawings, like numbers refer to like elements throughout.

Figure 1:
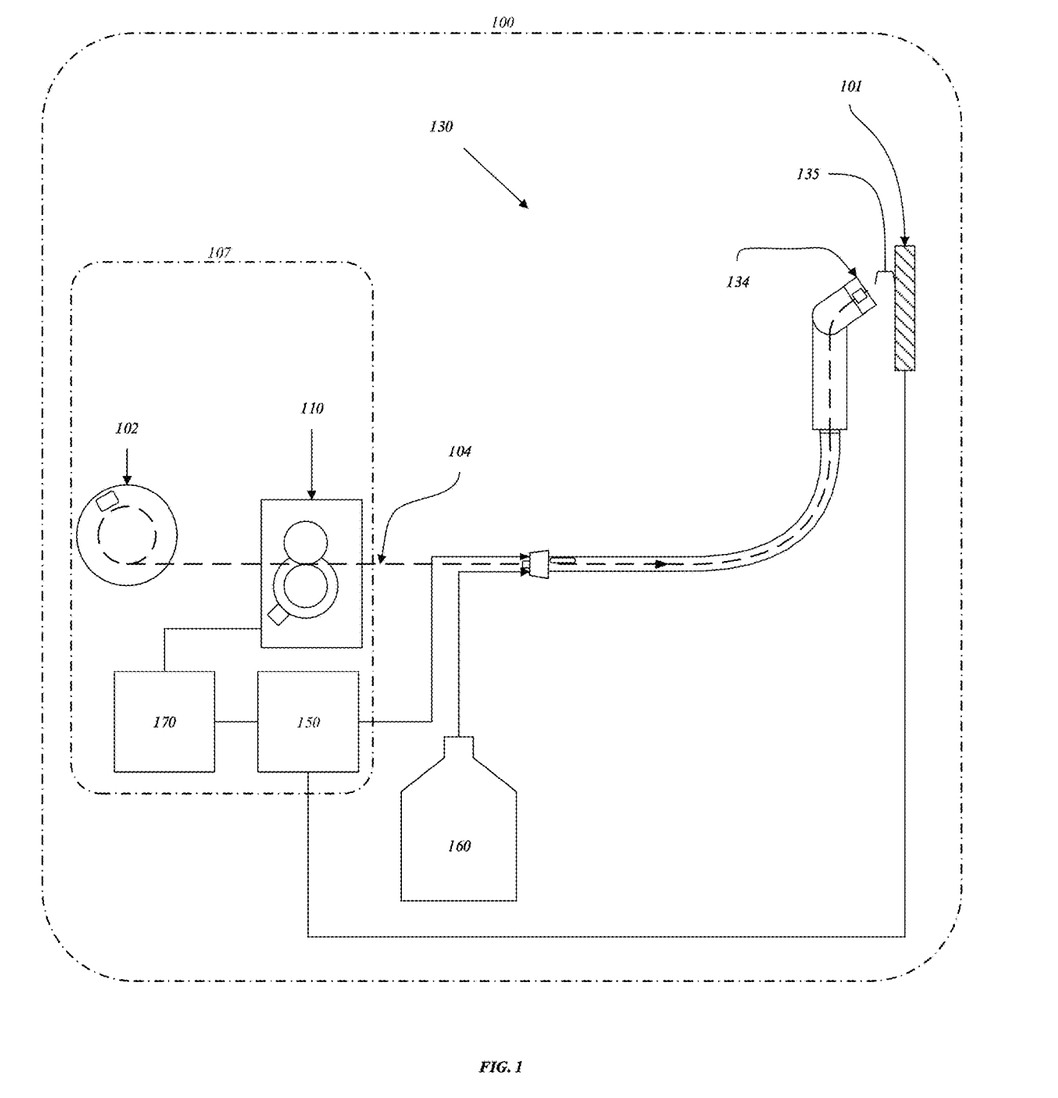
FIG. 1 is a schematic diagram of an exemplary welding device and a corresponding workpiece in accordance with an embodiment of the present disclosure.

Referring to FIG. 1, a schematic diagram of a welding device 100 and a corresponding workpiece 101 consistent with a non-limiting, exemplary embodiment of the present disclosure is shown. The welding device 100 can include a welding device housing 107, a torch 130, and a shielding gas supply 160. The welding device housing 107 may enclose a bobbin 102, a wire feed device 110, a power supply 150, and a control module 170. During a welding operation, the welding device 100 may cause the filler wire 104 to melt and join with the workpiece 101, such as by feeding the filler wire 104 through the torch tip 134 and fusing or welding the filler wire 104 with the workpiece 101 in a manner that will be familiar to those of ordinary skill in the art. In some embodiments the workpiece 101 may include a joint between two pieces of material that are to be fused together by a welding operation. The filler wire 104 may be deposited into the joint to fill the gap between the two pieces of material.

The wire feed device 110 may draw the filler wire 104 from a bobbin 102 and may feed the filler wire 104 to the torch 130, through the torch 130, and out of the torch tip 134. In various embodiments, control module 170 may supply power to and control operation of wire feed device 110. The bobbin 102 may include one or more of a reel, spool, spindle, cylinder, drum, roll, and/or coil around which the filler wire 104 may be wound. The bobbin 102 may rotate about a bobbin mount (not shown) as the filler wire 104 is drawn from the bobbin 102 during operation of the welding device 100.

During a welding operation, the filler wire 104 may be fused to the workpiece 101 via completion of an electrical circuit. For example, by channeling energy from the power supply 150 through the torch 130 to the torch tip 134, into the filler wire 104, across an arc gap 135 to the workpiece 101, and back to the power supply 150. Thus, electrical current flowing from the torch tip 134 into the filler wire 104 and across the arc gap 135 to the workpiece 101 may cause the filler wire 104 to fuse or weld with the workpiece 101.

The shielding gas supply 160 may contain a shielding gas including, but not limited to, one or more of argon, nitrogen, helium, and carbon dioxide. During a welding operation, the torch 130 may draw shielding gas from the shielding gas supply 160 and may expel the shielding gas from the torch tip 134 to envelope the arc gap 135. The torch tip 134 may include a diffuser (not shown) to uniformly disburse the shielding gas around the arc gap 135.

Enveloping the arc gap 135 in shielding gas may increase the quality and/or uniformity of a weld. Particularly, the shielding gas may, during a welding process, shield a weld from impurities, such as moisture, and may also prevent oxygenation of the weld. Oxygenation and impurities in a weld may weaken the corrosion-tolerance of the weld, may result in a porous weld, and/or may weaken the durability of the weld. In some embodiments, the shielding gas may be used to remove heat from one or more components of the welding device 100 to reduce operational stress on such components, thereby improving weld quality.

It will be appreciated that while the illustrated embodiment of the welding device 100 includes the components described above, additional components and/or combinations of components are contemplated and may be implemented in the welding device 100 without departing from the scope of the disclosure. For example, the shielding gas supply 160 may be omitted, and the filler wire 104 may be provided with a flux core, wherein energy flowing across the arc gap 135 may cause the flux core to form a cloud of shielding gas surrounding the arc gap 135. In another example, the welding device housing 107 may enclose the shielding gas supply 160 in addition to enclosing the bobbin 102, the wire feed device 110, and the power supply 150. In a further example, the power supply 150 may be external to the welding device housing 107.

Figure 2:
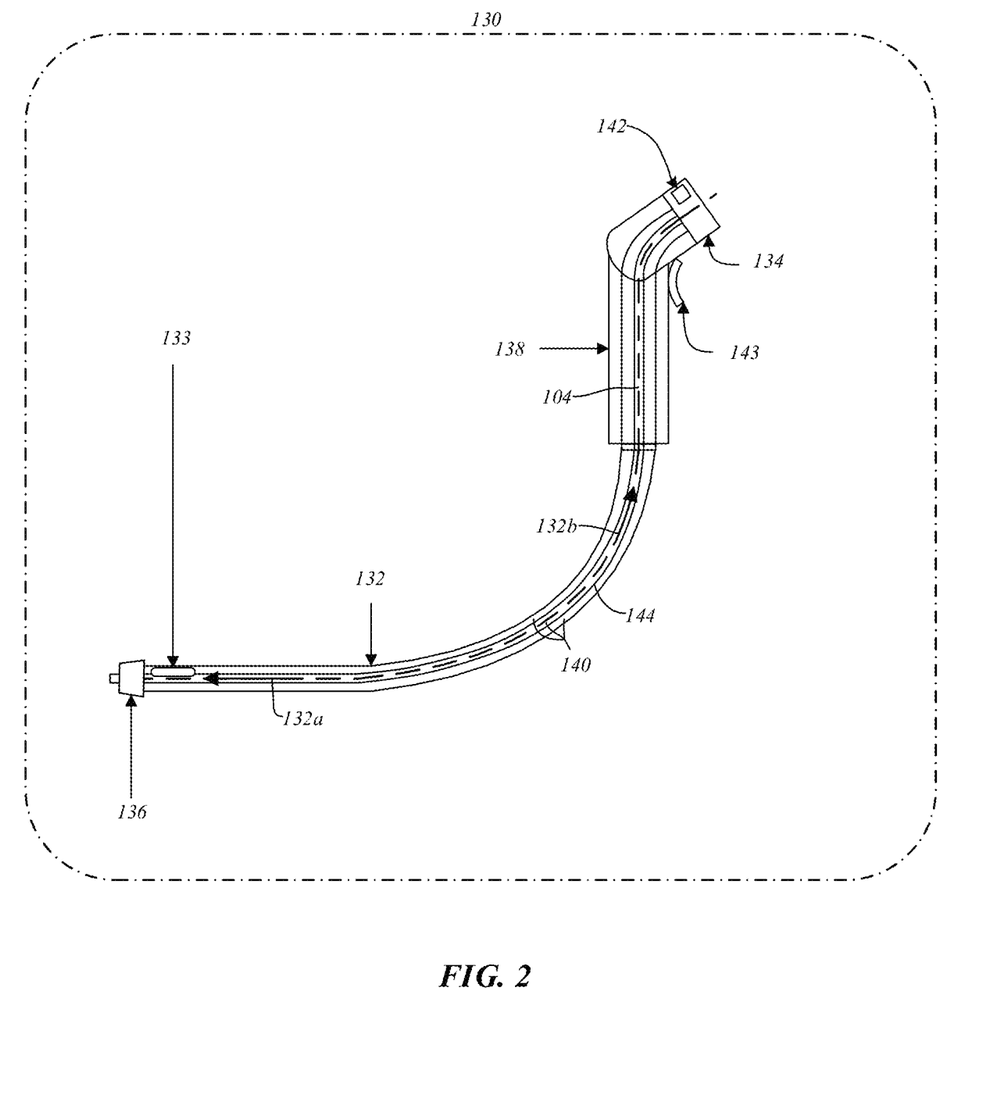
FIG. 2 is a side view illustrating an exemplary torch in accordance with an embodiment of the present disclosure.

Referring now to FIG. 2, a detailed side view of the torch 130 is shown. The torch 130 may include a torch cable 132, a torch handle 138, and a torch tip 134. The torch cable 132 may have a first end 132a and a second end 132b. The first end 132a may include a torch plug 136. The second end 132b may connect to the torch handle 138. The torch handle 138 may be attached to the torch tip 134. The torch tip 134 may house a torch encoder 142. The torch encoder 142 may measure an actual feed rate parameter related to the rate at which the filler wire 104 exits the torch tip 134. As used herein, an encoder may include or refer to one or more of a transducer, a sensor, or a detector that converts information from one format to another, such as by generating an electrical signal based on measurement of a physical quantity.

The torch 130 may include one or more interior channels 140 extending from the torch plug 136 to the torch tip 134. In the illustrated embodiment, the torch 130 may include three interior channels 140. One of the interior channels 140 may route the filler wire 104 from the torch plug 136 to the torch handle 138 while another of the interior channels 140 may route shielding gas from the torch plug 136 to the torch handle 138. In various embodiments, one of the interior channels 140 may route a welding cable from the torch plug 136 to the torch tip 134. In various such embodiments, the welding cable may provide an electrical current to the filler wire 104 at the torch tip 134.

In some embodiments, the filler wire 104 may be driven through the interior channel by the wire feed device 110 (FIG. 1) from the first end 132a towards the second end 132b in response to operation of a torch trigger 143. In the illustrated embodiment, the interior channel that routes the filler wire 104 from the torch plug 136 to the torch handle 138 may include a wire liner 144 formed of a relatively low-friction material. The wire liner 144 may allow the filler wire 104 to be driven through the interior channel 140 with less resistance than would be the case in the absence of the wire liner 144. Reducing frictional engagement between the filler wire 104 and the torch 130 thusly may reduce wear on the torch 130, thereby extending the useful life of the torch 130, and may also mitigate buckling of the filler wire 104. The wire liner 144 may be formed of one or more low-friction materials including, but not limited to, polymers (e.g., Nylon® and Teflon®), steel (e.g., spiral-wound steel), and/or a proprietary low-friction coating.

In the illustrated embodiment, the torch 130 may include a torch identification tag 133 that may contain information that is specific to the torch 130. Such information may include, but is not limited to, the make and/or model of the torch 130, various operational parameters of the torch 130, etc. In one example, the information contained in the torch identification tag 133 can be used to determine the length of the torch 130, which may be pertinent to the operation of the wire feed device 110 (FIG. 1) as further described below. In some embodiments, the torch identification tag 133 can be a radio frequency identification (RFID) tag, a barcode, a computer-readable medium, or the like. In other embodiments, the torch 130 may not include the torch identification tag 133. As will be described in more detail below, in such other embodiments, information specific to torch 130 may be provided via a user interface.

Figure 3:
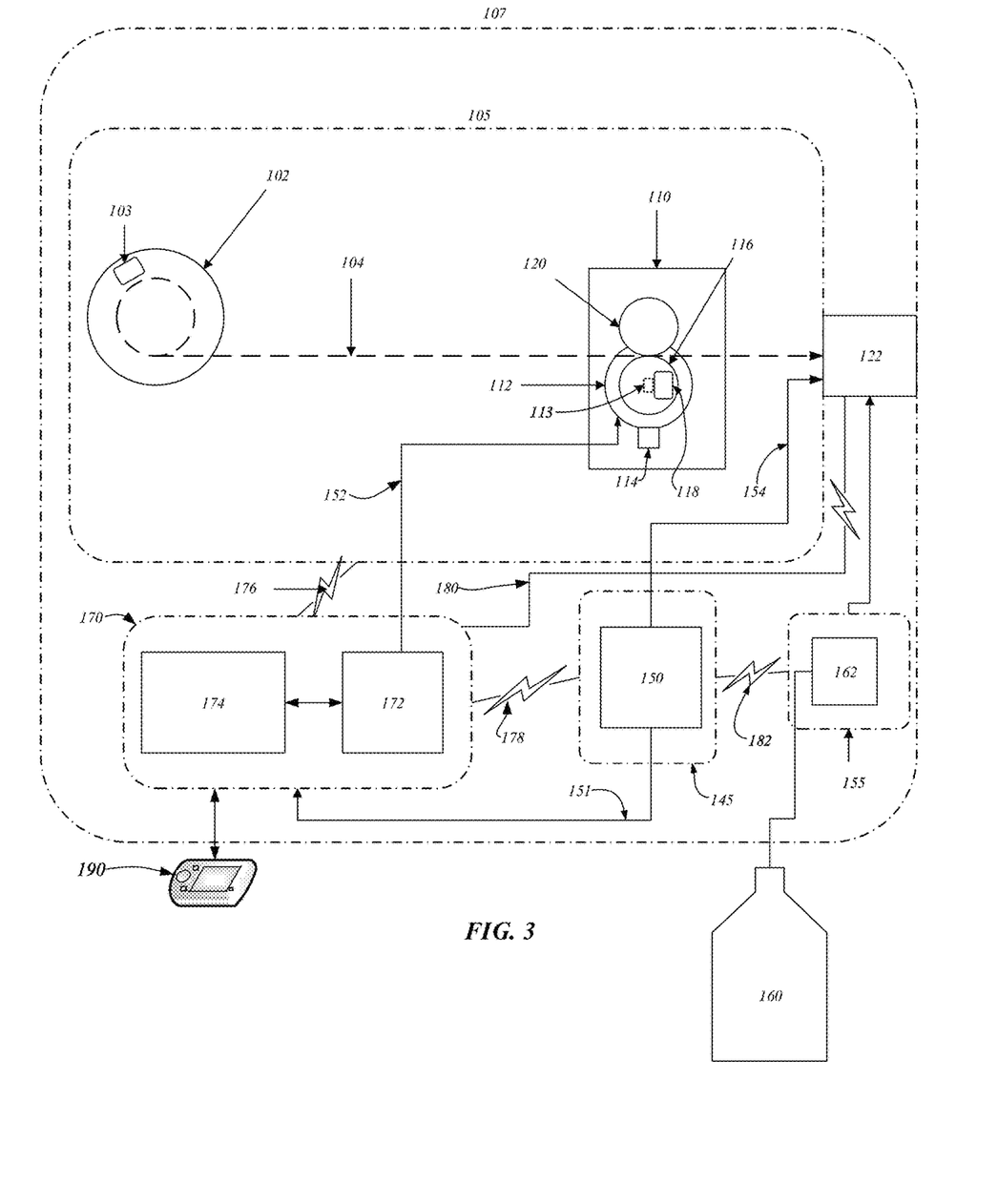
FIG. 3 is a schematic diagram illustrating an exemplary welder housing in accordance with an embodiment of the present disclosure.

Referring now to FIG. 3, a schematic diagram of the welding device housing 107 is shown. The welding device housing 107 may include a control module 170, a wire module 105, a power module 145, a torch plug receptacle 122, and a gas module 155. The control module 170 may be communicatively coupled with the wire module 105, the power module 145, the torch plug receptacle 122, and the gas module 155 by first, second, third, and fourth communication links 176, 178, 180, 182, respectively.

The wire module 105 may include the bobbin 102 and the wire feed device 110 (described above). The bobbin 102 may hold a supply of the filler wire 104. The filler wire 104 may be fed into the wire feed device 110. The wire feed device 110 may receive the filler wire 104 between a driving roller 116 and a driven roller 120. The driving roller 116 can be rotated by a motor 112. The driven roller 120, driving roller 116, and motor 112 may be arranged such that rotation of the driving roller 116 by the motor 112 develops sufficient friction between the rollers 116, 120 and the filler wire 104 to move the filler wire 104 towards the torch plug receptacle 122. The motor 112 may draw power from the control module 170 via motor power connection 152. The control module 170 may draw power from the power supply 150 in the power module 145 via control module power connection 151. In some embodiments, control module 170 may measure the current drawn by the motor 112. The power supply 150 may enable torch 130 (FIG. 1) to draw welding power from power supply 150 via welding power connection 154 and torch plug 122.

The bobbin 102 may include a bobbin identification tag 103. The bobbin identification tag 103 may contain information specific to the bobbin 102 as described above. The information contained on the bobbin identification tag 103 may be used to identify one or more of a type and a diameter of a filler wire that is wound around the bobbin 102. The driving roller 116 may include a roller identification tag 118. The roller identification tag 118 may contain information specific to the driving roller 116. The information contained on the roller identification tag 118 may be used to identify one or more of a diameter of the driving roller 116 and a groove type of the driving roller 116. In various embodiments, the groove type may include one or more of U, V, flat, knurled. In some embodiments, the bobbin identification tag 103 and/or the roller identification tag 118 may be one or more of an RFID tag, a barcode, a computer-readable medium, or the like. In various embodiments, the bobbin identification tag 103 and/or the roller identification tag 118 may not be included. In various such embodiments, one or more pieces of information described with respect thereto may be provided via user interface 190. For instance, the user interface 190 may include a display with a graphical user interface (GUI) and/or a set of mechanical interfaces (e.g., switches, knobs, buttons, keys, and the like) to enable a user to select the appropriate component characteristics.

The gas module 155 may include a gas manifold 162. The gas manifold 162 may route shielding gas from the shielding gas supply 160 to the torch plug receptacle 122. In some embodiments, the flow of shielding gas may be continuously and dynamically controlled. In other embodiments, the flow of shielding gas 160 may be controlled in discrete steps, such as "on" and "off".

As will be described in more detail below, the control module 170 may be responsible for implementing one or more functions of the welding device 100 (FIG. 1), such as identifying appropriate component characteristics and calculating operational parameters. The control module 170 may include a processor 172 communicatively coupled to a non-transitory computer-readable medium 174. The processor 172 may communicate control signals to one or more components of the wire module 105, power module 145, torch plug receptacle 122, and gas module 155 via first, second, third, or fourth communication links 176, 178, 180, 182, respectively.

In various embodiments, the control module 170 may receive power from the power supply 150. In various such embodiments, control module 170 may provide a portion of this power to motor 112. In some embodiments, the processor 172 may use the control signals to alter an amount of power or voltage that is supplied to one or more components of the wire module 105, the gas module 155, and the torch receptacle plug 122. In some embodiments, the processor 172 may execute instructions (e.g. instructions stored on the non-transitory computer-readable medium 174) to decode signals from the motor encoder 114 or to retrieve information from the identification tags 103, 118 via the first communication link 176. In various embodiments, the motor encoder 114 may measure a rate of rotation of the motor 112.

The torch plug receptacle 122 may be coupled to the torch 130 via the torch plug 136 (FIG. 2) to supply one or more of the filler wire 104, the shielding gas, and power to the torch 130 (FIG. 2). The torch plug receptacle 122 may additionally provide a communication link with one or more components of the torch 130. For example, the torch plug receptacle 122 may communicatively couple the processor 172 and the torch encoder 142 (FIG. 2).

It will be appreciated that while the illustrated embodiment of the control module 170 includes a proximate non-transitory computer-readable medium 174, other configurations and/or combinations of the control module 170 components are contemplated without departing from the scope of the disclosure. For example, the non-transitory computer-readable medium 174 may be located remote from the control module 170 without departing from the scope of the present disclosure. In another example, one or more portions of user interface 190 may be included in control module 170.

Figure 4:
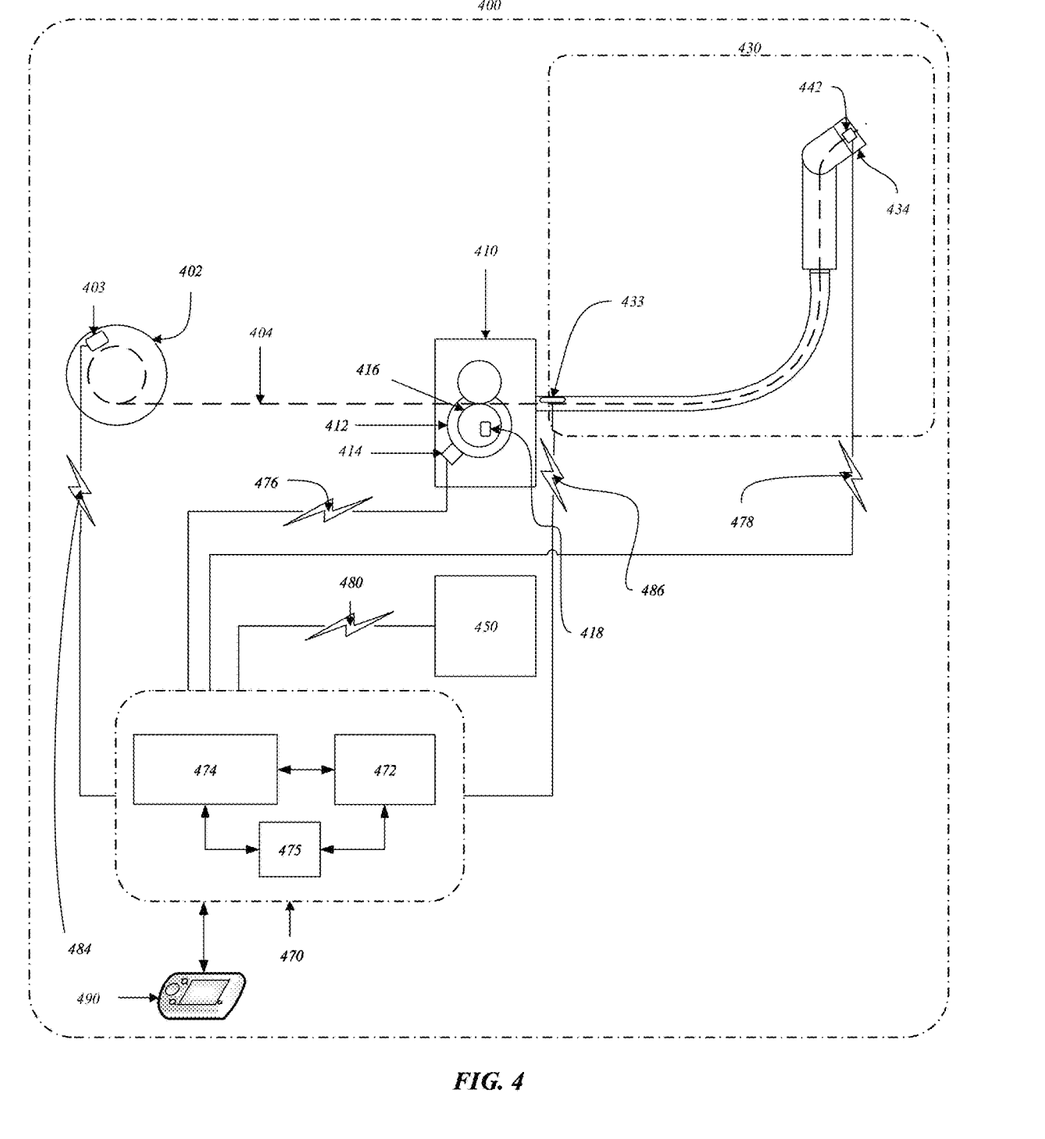
FIG. 4 is a schematic diagram illustrating an exemplary system for monitoring a wire feed device during a welding operation in accordance with an embodiment of the present disclosure.

Referring now to FIG. 4, a schematic diagram of a system 400 for monitoring a wire feed device consistent with a non-limiting, exemplary embodiment of the present disclosure is shown. The system 400 of FIG. 4 may include features and/or components that are substantially similar to those of the above-described welding device 100 (FIG. 1), including features and/or components of the torch 130 (FIG. 2) and the welding device housing 107 (FIG. 3). For example, the system 400 may include a control module 470, a wire feed device 410, a torch 430, and a power supply 450 which may be substantially similar to the control module 170, wire feed device 110, torch 130, and power supply 150 described above. The control module 470 may be communicatively coupled with the wire feed device 410, power supply 450, and torch 430 via first, second, and third communication links 476, 478, 480 respectively.

The wire feed device 410 can include a motor 412 and a motor encoder 414. In various embodiments, a current drawn by the motor 412 can cause the motor 412 to rotate a driving roller 416. The driving roller 416 may advance the filler wire 404 toward the torch tip 434. In the illustrated embodiment, the motor encoder 414 may measure a rate of rotation of the motor 412. In various embodiments, the rate of rotation of the motor 412 may be used in conjunction with a gear ratio and/or a diameter of driving roller 416 to determine an applied feed rate parameter of filler wire 404. In some embodiments, the rate of rotation may be the applied feed rate parameter. As will be appreciated, an encoder may be included on or used to measure aspects of components other than motor 412 without departing from the scope of this disclosure as long as the encoder measures a quantity that may be associated with rotation of the driving roller 416 to determine an applied feed rate of filler wire 404. For instance, an encoder could be assembled on a drive chain or gear train mechanism to get the same functionality.

In some embodiments, the torch 430 may include a torch encoder 442. The torch encoder 442 may measure the rate at which the filler wire 404 exits the torch tip 434. In various embodiments this rate may be referred to as the actual feed rate or actual feed rate parameter. Thus, slippage between the driving roller 416 and the filler wire 404 may cause a disparity between the applied feed rate parameter and the actual feed rate parameter. In some embodiments, the motor encoder 414 may be used as a main encoder for determining wire feed speed and the torch encoder 442 may be used for control/supervision. In other embodiments, the torch encoder 442 may be used as the main encoder in some welding configurations.

In various embodiments, the control module 470 can be responsible for monitoring and implementing one or more functions of the system 400, such as identifying slippage between the driving roller 416 and the filler wire 404. In another example, control module 470 may determine a current drawn by the motor 412, calculate an applied feed force parameter based on the current drawn by the motor, and update an error state indicator based on a comparison of the applied feed force parameter to a threshold feed force parameter. In yet another example, control module 470 may utilize a torque sensor measurement to calculate an applied feed force parameter, and update an error state indicator based on a comparison of the applied feed force parameter to a threshold feed force parameter. This and other functional aspects of control module 470 will be described in more detail below.

The control module 470 may have a plurality of components that are communicatively coupled to one another, including a processor 472, a non-transitory computer-readable medium 474, and a tag reader 475. The processor 472 can communicate with one or more components of the wire feed device 410, power supply 450, and torch 430 via first, second, or third communication links 476, 478, 480 respectively. In some embodiments, the control module 470 may monitor and implement one or more functions of the system 400 based on characteristics of components of the system 400.

The tag reader 475 may communicatively couple with the bobbin identification tag 403, the roller identification tag 418, and/or the torch identification tag 433. The tag reader 475 may retrieve information stored on the bobbin identification tag 403 and the torch identification tag 433 via first and second reader communication links 484, 486 respectively. Additionally, the tag reader 475 may retrieve information stored in the roller identification tag 418 via another reader communication link (not shown) or via first communication link 476. In some embodiments, one or more of these communication links may be wireless.

In various embodiments, the information stored on the bobbin identification tag 403 may include one or more filler wire characteristics, the information stored on the torch identification tag 433 may include one or more torch characteristics, and the information stored on the roller identification tag 418 may include one or more roller characteristics. For example, the bobbin identification tag 403 may contain information that identifies one or more of a type of filler wire 404 or a diameter of filler wire 404 that is wound about the bobbin 402. In another example, the torch identification tag 433 may contain information that identifies one or more of a type of the torch 430 or a length of the torch 430. In a further example, the roller identification tag 418 may contain information that identifies one or more of a diameter of the roller, a groove type, a gear ratio, a conversion factor, and/or a transfer function. In various embodiments described herein, the control module 470 may implement one or more functions of the system 400 based on information retrieved by tag reader 475.

The tag reader 475 may wirelessly communicate with one or more of the tags 403, 418, 433 to retrieve information contained on the tags 403, 418, 433. In one non-limiting example, wireless communications within the disclosed tag reader 475 can include any of a variety of appropriate radio-frequency identification (RFID) techniques including, but not limited to, near field communication (NFC) techniques. In one arrangement, sometimes known as an active reader passive tag (ARPT) system, the reader may interrogate the tag by sending signals to it. The tag derives energy from the signals sent by the reader and uses the energy to respond to the reader with identification information. In another arrangement, often referred to as an active reader active tag (ARAT) system, the reader sends a signal to the tag requesting a return signal including identification information. The tag receives the signal and replies to the signal using an internal energy source. In a third arrangement, known as a Passive Reader Active Tag (PRAT) system, the tag uses an internal energy source to send a signal to a passive reader. This signal can comprise identification information. The passive reader only receives signals and does not interrogate the tag. Alternative embodiments may make use of a personal area network (e.g. Bluetooth®), a barcode, or biometric technologies.

In some embodiments, the system 400 may not include tag reader 475 and/or one or more of the identification tags 403, 418, 433. In some such embodiments, one or more of the filler wire, roller, or torch characteristics may be identified based on input received via user interface 490. In various embodiments, one or more of the filler wire, roller, or torch characteristics may already be stored in non-transitory computer-readable medium 474. For instance, one or more roller characteristics may be stored in non-transitory computer-readable medium 474 at manufacture.

As previously mentioned, the control module 470 can be responsible for monitoring and implementing one or more functions of the system 400. In some embodiments, the processor 472 of the control module 470 may determine a number of parameters of the system 400 including one or more of an actual feed rate parameter, an applied feed rate parameter, an applied feed force parameter, a threshold feed force parameter, and an ideal feed rate parameter. In various embodiments, one or more operation aspects of the system 400 may be altered by control module 470 based on one or more of the actual feed rate parameter, the applied feed rate parameter, the applied feed force parameter, the threshold feed force parameter, and the ideal feed rate parameter. For example, processor 472 may increase the voltage supplied to motor 412 in response to the applied feed rate parameter falling below the ideal feed rate parameter.

In various embodiments, the actual feed rate parameter can be determined by the processor 472 through the torch encoder 442 as the rate at which the filler wire 404 exits the torch tip 434. The applied feed rate parameter may be determined by the processor 472 through the rate of rotation measured by the motor encoder 414 and one or more roller characteristics, such as the diameter of driving roller 416, a gear ratio, a conversion factor, a groove type, a transfer function, or the like. In some embodiments, the applied feed rate parameter may include a rotational speed of the driving roller 416. In various embodiments, the diameter of the driving roller 416 may be determined via roller identification tag 418. In various embodiments, the applied feed force parameter may be determined by the processor 472 based on the current drawn by the motor 412. In some embodiments, the applied feed force parameter may be determined using a torque sensor 113. For instance, torque sensor 113 may be attached to a gear-shaft between the motor 412 and the driving roller 416. In such instances, processor 472 may calculate the applied feed force parameter using one or more torque sensor measurements. In some embodiments, the applied feed force parameter may be determined by the processor 472 based on the current drawn by the motor 412 and one or more characteristics of the filler wire, the roller, and/or the torch. In various embodiments, the applied feed force parameter may include a torque of the motor 412. In some embodiments, the current drawn by the motor 412 may be proportional to torque of the motor 412. In various embodiments, the applied feed force parameter, the applied feed rate parameter, or the actual feed rate parameter may be a moving average. The moving average may be stored on the non-transitory computer-readable medium 474.

The ideal feed rate and threshold feed force parameters may be determined by consulting an ideal/threshold parameter data store with regard to one or more characteristics of components of the system 400, such as the filler wire type, filler wire diameter, torch type, and torch length. The ideal/threshold parameter data store may include threshold feed force parameters and ideal feed rate parameters for all combinations of filler wire type, filler wire diameter, torch type, and torch length. In the illustrated embodiment, the non-transitory computer-readable medium 474 can store the ideal parameter data store. In some embodiments, the ideal parameter data store may include a component matrix.

The processor 472 can compare the ideal feed rate parameter or the threshold feed force parameter to the applied feed force parameter or the applied feed rate parameter to alter one or more operation parameters of the system 400, such as by updating an error state indicator (e.g., user interface 490) or altering a supplied voltage. By comparing ideal/threshold and applied parameters, the processor 472 may determine if the system 400 is operating within recommended or predetermined specifications. For example, if applied feed force parameters are found to be above the threshold feed force parameter an error state, such as unduly high filler wire feed forces, may exist. In another example, if applied feed rate parameters are found to be below the ideal feed rate parameter a voltage supplied to the motor 412 by the control module 470 may be increased. In some embodiments, operating outside of the recommended or predetermined specification may be indicative of a mechanical failure within system 400. In some such embodiments, the mechanical failure may include one or more of contamination, a faulty wire liner, or other component performance issues.

In various embodiments, the processor 472 can compare the actual feed rate parameter to the applied feed rate parameter or the applied feed force parameter to update a second error state indicator. In various such embodiments, the second error state indicator may be the same as the error state indicator (e.g., user interface 490 may include a plurality of error state indicators). By comparing the actual feed rate parameter to applied parameters, the processor 472 may determine if the system 400 is suffering from a mechanical failure. The mechanical failure may include one or more of filler wire slippage at the driving roller, a faulty wire liner, or other component performance issues. For example, if the actual feed rate is less than the applied parameter then the wire liner may be contaminated or dirty, indicating an error state. In various embodiments, detection of an error state may cause the processor 472 to adjust an amount of power supplied by the power supply 450 to one or more components of the wire feed device 410, the torch 430, and the control module 470.

In some embodiments, the processor 472 may be communicatively coupled to the user interface 490 to indicate an error in the system 400 as part of updating the error state indicator. In some such embodiments, the user interface 490 may generate one or more of an audio, visual, or haptic signal to indicate the error. In various embodiments, in response to, as part or, or in conjunction with updating an error state indicator, a message may be displayed on the user interface 490. In various such embodiments, the message may identify a cause of the error, a potential component causing the error, and/or a potential instruction to resolve the error. An exemplary message identifying a cause of the error may be "High wire feed forces are detected". An exemplary message identifying a potential component causing the error may be "Wire slippage detected at driving roller". Exemplary messages identifying potential instructions to resolve an error can include: "Replace wire liner", "Check for obstacles on torch", and "Check of loops on torch".

The user interface 490 may receive inputs to view, adjust, and/or set one or more parameters of the system 400. For example, a user may scroll through a plurality of messages relating to an error state via appropriate inputs to the user interface 490. In some embodiments the user interface 490 may be used to override an error. In various embodiments, the user interface 490 may be used to identify one or more component characteristics of system 400. For instance, user interface 490 may include a touch screen to enable a user to input one or more component characteristics of system 400. In some embodiments, the user interface 490 may include one or more of a display, a graphical user interface (GUI), a set of mechanical interfaces (e.g., switches, knobs, buttons, keys, and the like), a speaker, a light emitting diode (LED), or a vibrator.

In some embodiments, the control module 470 can be a computer system. Such a computer system may include a computer, an input device, a display unit, and an interface, for example, for accessing the Internet. The computer may include a microprocessor. The microprocessor may be connected to a communication bus. The computer may also include memories (e.g. the non-transitory computer-readable medium 474). The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

The computer system executes a set of instructions that are stored in one or more storage elements, in order to process input data such as sensor data from the encoders 414, 442. The storage elements may also store data or other information (e.g., ideal parameter data store) as desired or as needed. The storage element may be an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine (e.g., processor 472) may be in response to user commands, or in response to results of previous processing, or in response to a request made by another processing machine.

As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 5:
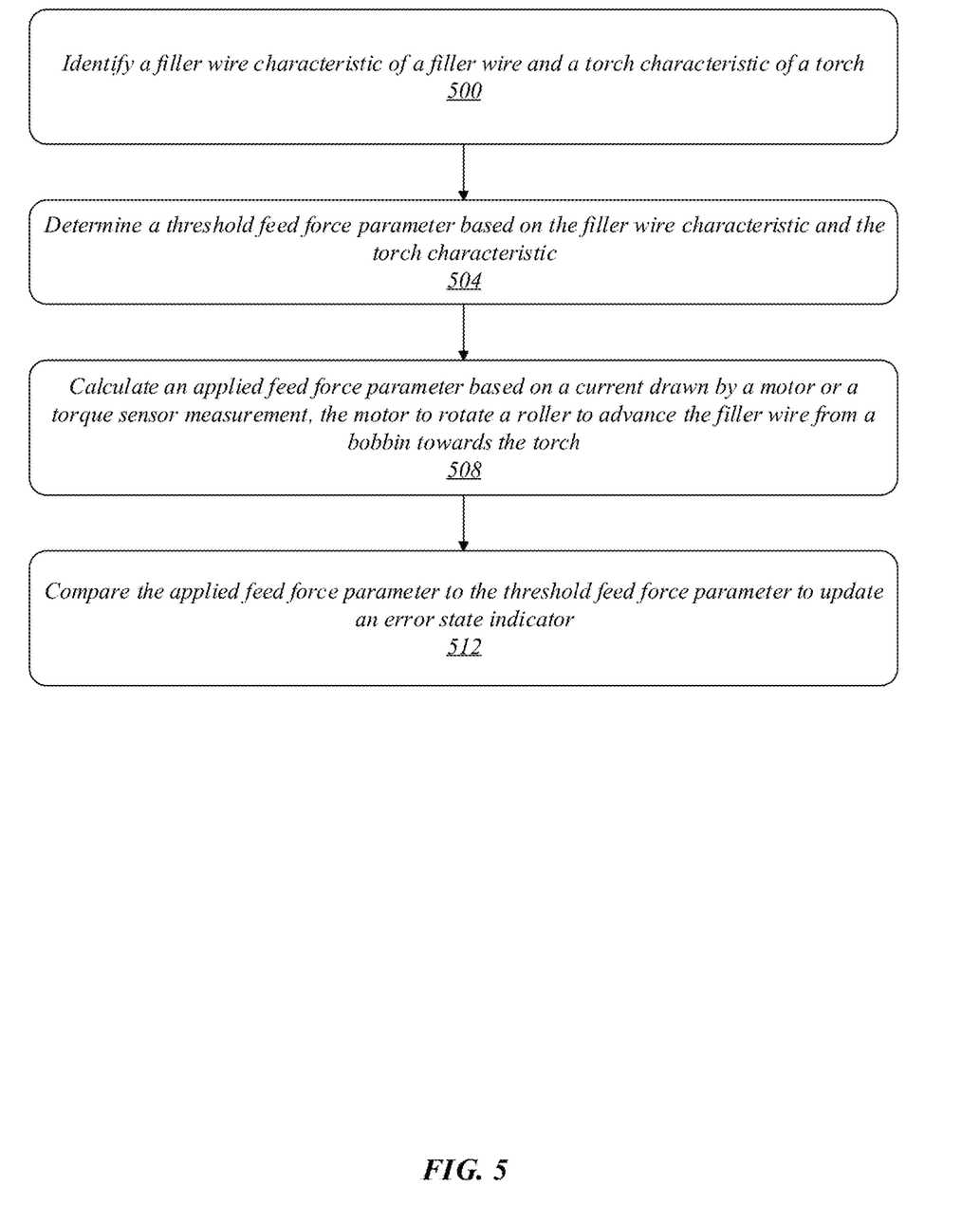
FIG. 5 is a logic diagram illustrating an exemplary method for monitoring a welding device in accordance with an embodiment of the present disclosure.

Referring to FIG. 5, a flow diagram illustrating an exemplary method in accordance with an embodiment of the present disclosure is shown. In particular, the method is directed toward monitoring a welding device and more specifically to continuously monitoring filler wire feed parameters of a welding device with the hardware and components described herein. The method will now be described in detail with reference to the system 400 and various components shown in FIGS. 1-4.

As shown in block 500, a filler wire characteristic of a filler wire and a torch characteristic of a torch may be identified. For example, the one or more component characteristics, such as the filler wire characteristic and/or the torch characteristic may be retrieved by tag reader 475 and provided to processor 472. In another example, the filler wire characteristic may be received via user interface 490. In some embodiments, a roller characteristic of the roller 116, 416 may be identified.

At block 504, a threshold feed force parameter may be determined based on the filler wire characteristic and the torch characteristic. For example, one or more of an ideal feed rate parameter and a threshold feed force parameter may be determined by consulting an ideal/threshold parameter data store with regard to one or more characteristics of components of the system 400, such as the filler wire type, filler wire diameter, torch type, and torch length. In some embodiments, the ideal/threshold parameter data store may be stored on non-transitory computer-readable medium 174, 474. In various embodiments, the ideal/threshold parameter data store may include threshold feed force parameters and ideal feed rate parameters for all combinations of filler wire type, filler wire diameter, torch type, and torch length.

Proceeding to block 508, an applied feed force parameter may be calculated based on a current drawn by a motor or a torque sensor measurement. Further, the motor may rotate a roller to advance the filler wire from a bobbin towards the torch. For example, control module 170, 470 may calculate the applied feed force parameter based on current drawn by motor 112, 412. In another example, control module 170, 470 may calculate the applied feed force parameter based on a measurement by torque sensor 113. In some embodiments, the processor 172, 472 may calculate the applied feed force parameter based on the current drawn by the motor 112, 412 or a measurement by toque sensor 114 and one or more component characteristics, such as a characteristic of roller 116, 416. In some such embodiments, the roller characteristic may comprise one or more of a diameter of the roller, a groove type, a gear ratio, a conversion factor, and a transfer function.

Continuing to block 512, the applied feed force parameter may be compared to the threshold feed force parameter to update an error state indicator. In various embodiments, the error state indicator may comprise a user interface 190, 490 communicatively coupled to the processor 172, 472, the processor to execute instructions stored on the non-transitory computer-readable medium 474 to update the error state indicator via indication of an error with the user interface 190, 490 via one or more audio, visual, or haptic signals. In various such embodiments, the one or more audio, visual, or haptic signals comprising one or more of a message to identify a potential cause of the error and an instruction to resolve the error. For example, the error message may identify the wire liner as the potential cause of the error. In another example, the error message may include cleaning or replacing the wire liner as the potential instruction to resolve the error.

The following examples pertain to further embodiments, from which numerous permutations and configurations will be apparent.

Example 1 is a system for monitoring a welding device, the system comprising: a wire feed device including a motor and a roller, the motor to rotate the roller to advance a filler wire from a bobbin towards a torch; and a processor communicatively coupled to a non-transitory computer-readable medium, the processor to execute instructions stored on the non-transitory computer-readable medium to: identify a filler wire characteristic of the filler wire and a torch characteristic of the torch; determine a threshold feed force parameter based on the filler wire characteristic and the torch characteristic; calculate an applied feed force parameter based on a current drawn by the motor or a torque sensor measurement; and compare the applied feed force parameter to the threshold feed force parameter to update an error state indicator.

Example 2 includes the subject matter of Example 1, comprising a first encoder communicatively coupled to the processor, the first encoder to measure a rate of rotation associated with rotation of the roller by the motor, and the processor to execute instructions stored on the non-transitory computer-readable medium to: determine an ideal feed rate parameter based on the filler wire characteristic; calculate an applied feed rate parameter based on the rate of rotation measured by the first encoder; and adjust a voltage supplied to the motor based on a comparison of the applied feed rate parameter to the ideal feed rate parameter.

Example 3 includes the subject matter of Example 2, comprising a second encoder communicatively coupled to the processor, the second encoder to measure an actual feed rate parameter of the filler wire, and the processor to execute instructions stored on the non-transitory computer-readable medium to compare the actual feed rate parameter to the applied feed rate parameter to update a second error state indicator.

Example 4 includes the subject matter of Example 1, comprising an identification tag reader communicatively coupled to the processor, the bobbin having a first identification tag and the torch having a second identification tag, the identification tag reader to retrieve the filler wire characteristic from the first identification tag and the torch characteristic from the second identification tag.

Example 5 includes the subject matter of Example 1, comprising an identification tag reader communicatively coupled to the processor, the roller having an identification tag, the identification tag reader to retrieve a roller characteristic from the identification tag, and the processor to execute instructions stored on the non-transitory computer-readable medium to calculate the applied feed force parameter based on the current drawn by the motor or the torque sensor measurement and the roller characteristic.

Example 6 includes the subject matter of Example 5, the roller characteristic comprising one or more of a diameter of the roller, a groove type, a gear ratio, a conversion factor, and a transfer function.

Example 7 includes the subject matter of Example 1, the error state indicator comprising a user interface communicatively coupled to the processor, the processor to execute instructions stored on the non-transitory computer-readable medium to update the error state indicator via indication of an error with the user interface via one or more audio, visual, or haptic signals.

Example 8 includes the subject matter of Example 7, the one or more audio, visual, or haptic signals comprising one or more of a message to identify a potential cause of the error and an instruction to resolve the error.

Example 9 includes the subject matter of Example 1, the filler wire characteristic comprising one or more of a filler wire type, a filler wire diameter, and a filler wire material.

Example 10 includes the subject matter of Example 1, the torch characteristic comprising one or more of a torch length and a torch type.

Example 11 is a method for monitoring a welding device, the method comprising: identifying a filler wire characteristic of a filler wire and a torch characteristic of a torch; determining a threshold feed force parameter based on the filler wire characteristic and the torch characteristic; calculating an applied feed force parameter based on a current drawn by a motor or a torque sensor measurement, the motor to rotate a roller to advance the filler wire from a bobbin towards the torch; and comparing the applied feed force parameter to the threshold feed force parameter to update an error state indicator.

Example 12 includes the subject matter of Example 11, comprising: determining an ideal feed rate parameter based on the filler wire characteristic; measuring a rate of rotation associated with rotation of the roller by the motor; calculating an applied feed rate parameter based on the rate of rotation measured by the first encoder; and adjusting a voltage supplied to the motor based on a comparison of the applied feed rate parameter to the ideal feed rate parameter.

Example 13 includes the subject matter of Example 12, comprising: measuring an actual feed rate parameter of the filler wire; and comparing the actual feed rate parameter to the applied feed rate parameter to update a second error state indicator.

Example 14 includes the subject matter of Example 11, comprising wirelessly retrieving the filler wire characteristic from a first identification tag associated with the bobbin and retrieving the torch characteristic from a second identification tag associated with the torch.

Example 15 includes the subject matter of Example 11, comprising: retrieving a roller characteristic from an identification tag associated with the roller; and calculating the applied feed force parameter based on the current drawn by the motor or the torque sensor measurement and the roller characteristic.

Example 16 includes the subject matter of Example 15, the roller characteristic comprising one or more of a diameter of the roller, a groove type, a gear ration, a conversion factor, and a transfer function.

Example 17 includes the subject matter of Example 11, updating the error state indicator comprising indicating an error with one or more of an audio, visual, or haptic signal.

Example 18 includes the subject matter of Example 17, indication of the error comprising one or more of a message to identify a potential cause of the error and an instruction to resolve the error.

Example 19 includes the subject matter of Example 11, the filler wire characteristic comprising one or more of a filler wire type, a filler wire diameter, and a filler wire material.

Example 20 includes the subject matter of Example 11, the torch characteristic comprising one or more of a torch length and a torch type.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for monitoring a welding device, the system comprising:
a wire feed device including a motor and a roller, the motor to rotate the roller to advance a filler wire from a bobbin towards a torch; and
a processor communicatively coupled to a non-transitory computer-readable medium, the processor to execute instructions stored on the non-transitory computer-readable medium to:
identify a filler wire characteristic of the filler wire and a torch characteristic of the torch;
determine a threshold feed force parameter based on the filler wire characteristic and the torch characteristic;
calculate an applied feed force parameter based on a current drawn by the motor or a torque sensor measurement;
compare the applied feed force parameter to the threshold feed force parameter to update an error state indicator,
the system further comprising a first encoder communicatively coupled to the processor, the first encoder to measure a rate of rotation associated with rotation of the roller by the motor, and the processor to execute instructions stored on the non-transitory computer-readable medium to:
determine an ideal feed rate parameter based on the filler wire characteristic;
calculate an applied feed rate parameter based on the rate of rotation measured by the first encoder; and
adjust a voltage supplied to the motor based on a comparison of the applied feed rate parameter to the ideal feed rate parameter; and
a second encoder communicatively coupled to the processor, the second encoder to measure an actual feed rate parameter of the filler wire, and the processor to execute instructions stored on the non-transitory computer-readable medium to compare the actual feed rate parameter to the applied feed rate parameter to update a second error state indicator; and a user interface, communicatively couple to the processor, that indicates the error state indicator and the second error state indicator.

2. The system of claim 1, comprising an identification tag reader communicatively coupled to the processor, the bobbin having a first identification tag and the torch having a second identification tag, the identification tag reader to retrieve the filler wire characteristic from the first identification tag and the torch characteristic from the second identification tag.

3. The system of claim 1, comprising an identification tag reader communicatively coupled to the processor, the roller having an identification tag, the identification tag reader to retrieve a roller characteristic from the identification tag, and the processor to execute instructions stored on the non-transitory computer-readable medium to calculate the applied feed force parameter based on the current drawn by the motor or the torque sensor measurement and the roller characteristic.

4. The system of claim 3, the roller characteristic comprising one or more of a diameter of the roller, a groove type, a gear ratio, a conversion factor, and a transfer function.

5. The system of claim 1, wherein the user interface indicates the error state indicator and the second an error state indicator via one or more audio, visual, or haptic signals.

6. The system of claim 5, the one or more audio, visual, or haptic signals comprising one or more of a message to identify a potential cause of an error and an instruction to resolve the error.

7. The system of claim 1, the filler wire characteristic comprising one or more of a filler wire type, a filler wire diameter, and a filler wire material.

8. The system of claim 1, the torch characteristic comprising one or more of a torch length and a torch type.

9. A method for monitoring a welding device, the method comprising:
identifying a filler wire characteristic of a filler wire and a torch characteristic of a torch;
determining a threshold feed force parameter based on the filler wire characteristic and the torch characteristic;
calculating an applied feed force parameter based on a current drawn by a motor or a torque sensor measurement, the motor to rotate a roller to advance the filler wire from a bobbin towards the torch;
comparing the applied feed force parameter to the threshold feed force parameter to update an error state indicator,
determining an ideal feed rate parameter based on the filler wire characteristic;
measuring a rate of rotation associated with rotation of the roller by the motor using a first encoder;
calculating an applied feed rate parameter based on the rate of rotation; and
adjusting a voltage supplied to the motor based on a comparison of the applied feed rate parameter to the ideal feed rate parameter;
measuring an actual feed rate parameter of the filler wire;
comparing the actual feed rate parameter to the applied feed rate parameter to update a second error state indicator; and
indicating on a user interface the error state indicator and the second error state indicator.

10. The method of claim 9, comprising wirelessly retrieving the filler wire characteristic from a first identification tag associated with the bobbin and retrieving the torch characteristic from a second identification tag associated with the torch.

11. The method of claim 9, comprising:
retrieving a roller characteristic from an identification tag associated with the roller; and
calculating the applied feed force parameter based on the current drawn by the motor or the torque sensor measurement and the roller characteristic.

12. The method of claim 11, the roller characteristic comprising one or more of a diameter of the roller, a groove type, a gear ration, a conversion factor, and a transfer function.

13. The method of claim 9, further comprising indicating the error state indicator and the second error state indicator via one or more of an audio, visual, or haptic signal.

14. The method of claim 13, wherein the audio, visual, or haptic signal includes one or more of a message to identify a potential cause of an error and an instruction to resolve the error.

15. The method of claim 9, the filler wire characteristic comprising one or more of a filler wire type, a filler wire diameter, and a filler wire material.

16. The method of claim 9, the torch characteristic comprising one or more of a torch length and a torch type.

* * * * *